United States Patent [19]

Mallow

[11] Patent Number: 5,358,994
[45] Date of Patent: Oct. 25, 1994

[54] THERMOPLASTIC MATERIAL FOR PRODUCTION AND REPAIR OF POLYMERIC PRODUCTS AND COATING OF METALS

[75] Inventor: William A. Mallow, Helotes, Tex.

[73] Assignee: Gas Research Institute, Chicago, Ill.

[21] Appl. No.: 938,453

[22] Filed: Aug. 31, 1992

[51] Int. Cl.$^5$ ............................................. C08K 3/04
[52] U.S. Cl. ................................... 524/495; 138/98; 524/496; 524/528; 524/906; 525/240
[58] Field of Search ............... 524/495, 496, 528, 906; 525/240; 138/98

[56] References Cited

U.S. PATENT DOCUMENTS 4,374,227  2/1983  Michie .................................. 525/240

FOREIGN PATENT DOCUMENTS 1106521  8/1981  Canada .
2208265  9/1972  Fed. Rep. of Germany .

*Primary Examiner*—Veronica P. Hoke
*Attorney, Agent, or Firm*—Viviana Amzel

[57] ABSTRACT

A composition of matter comprises 100–800 parts by weight polyethylenes and copolymers thereof having a melt index of 1–4 g/10 min., a density of 0.93–0.95 g/cc and a weight average molecular weight of $5-1.0 \times 10^5$; 100–400 parts by weight polyethylenes having a melt index of 2–4 g/10 min., a density of 0.93–0.95 g/cc and a molecular weight of $6-20 \times 10^4$; 0–100 parts by weight polypropylene having a melt index of 5–9 g/10 min. and a density of 0.8–1.2 g/cc; 0–150 parts by weight copolymer such as ethylene-propylene or ethylene-vinyl acetate; 0–100 parts by weight graphite or carbon black; 0.04–0.2 parts by weight antioxidant; and 0.1–2.0 parts by weight light stabilizer. A sealant is obtained by compression, extrusion or injection molding the composition described above. A polyethylene surface repair or reinforcing kit comprises the sealant or thermoplastic repair material of the invention, a thin, heat-resistant, adhesion-resistant barrier, and a polyethylene surface enzyme cleaner. A method of repairing or reinforcing a polyethylene surface comprises applying over an area of the surface in need of repair or reinforcement the sealant or thermoplastic repair material of the invention, heating the area of contact between the sealant and the surface to produce thermal fusion therebetween, and cooling the fused surface. A method of preparing a thermoplastic polyethylene surface sealant or thermoplastic repair product comprises blending the composition of the invention, and compression, injection or extrusion molding the blend to form a product of a desired shape.

9 Claims, No Drawings

THERMOPLASTIC MATERIAL FOR PRODUCTION AND REPAIR OF POLYMERIC PRODUCTS AND COATING OF METALS

BACKGROUND OF THE INVENTION

Field of the Invention

This invention relates to a sealant composition comprising a selected blend of powdered granular or pelletized polyethylenes and copolymers thereof having specific melt indices and molecular weights. The composition is optionally compounded with powdered copolymers of ethylene/propylene and/or ethylene/vinyl acetate as well as selected fillers, antioxidants and stabilizers. The composition may be compression, extrusion or injection molded into a sealant, e.g., in the form of a linear sheet conforming to a pipe surface, into solid rods for spin frictional fusion or into a coating for steel and wire surfaces. The sealant or thermochemical repair material of the invention is suitable for repairing and/or reinforcing surfaces such as those of polyethylene pipes, and fittings, and for the production and repair of plastic membranes such as those used on liners in landfill operations and the like. The composition is also adaptable for use as a coating for metalic and non-metalic surfaces. When in the form of a sheet, the sealant or thermochemical repair material may be applied to a portion of a surface to be repaired, and the area of contact between the sealant or thermochemical repair material and the surface then heated at a specified temperature to produce thermal fusion therebetween, and then cooled. This invention also relates to a polyethylene surface repair or reinforcing kit that comprises the sealant of the invention, a thin, heat-resistant, adhesion-resistant barrier and a polyethylene surface cleaner. Also part of this invention is a method of preparing the sealant of the invention by blending its components and then extrusion, compression or injection molding the blend to form the sealant.

DESCRIPTION OF THE BACKGROUND

Traditionally, the in-situ repairing of a damaged polymer pipe required the excision and removal of a damaged section, and the addition of a new, smooth surfaced portion and its welding to the old portions of the pipe. This is a costly procedure due to the amount of new plastic pipe required and the man hours expended on the repair job (see, for example, U.S. Pat. No. 4,853,165 and U.S. Pat. No. 4,775,501 to Rosensweig, et al).

More recently, other methods were described in the literature which utilize a patch for sealing the damaged walls of containers and pipes. One example is the method disclosed in U.S. Pat. No. 5 4,880,035. In this prior art method, a sealing pad for damaged walls of leaking containers and pipes is manufactured from reinforced sections of unvulcanized rubber. The sealing pad is joined by vulcanization in a press and heated to form an air-tight inner chamber, and a nipple is connected to the chamber. The sealing pad is rectangular in shape and comprises two pad surfaces of the same size and shape provided with attachments for applying tension to the pad. The pad surfaces are both internally reinforced with flexible, linear reinforcing elements that bisect each other.

U.S. Pat. No. 5,002,093 discloses a repair patch for a tubular fluid-containing vessel that comprises a sheet of heat-shrinkable material, and take-up means for tightening the sheet around the vessel. The take-up means comprises a housing, an axle mounted on the housing, a ratchet gear mounted on the axle, a pawl for engaging the ratchet gear and means for attaching the ends of the material to the housing and axle. The patch is particularly adapted for repairing pipes and hoses carrying, e.g., a coolant for internal combustion engines.

U.S. Pat. No. 4,713,133 to Kent describes a process for affixing to a substrate a non-tacky, flexible layer of a raw polymer mixture containing a minor proportion of high-density polyethylene, linear low-density polyethylene or isotactic polypropylene and a major proportion of elastomeric polymer comprising at least 50 wt. % butyl rubber by applying a stretching elongation to the flexible layer before application to the substrate. This process may be used to cover metal parts, to make repairs to cracked cover components, for electrical wiring splicing and for repairing leaks in pipes and hoses.

U.S. Pat. No. 3,457,129 to Butler discloses a ski repair method, utilizing a means for repairing the polyethylene base of a ski having an indentation. The method comprises filling the indentation with a powdered, high-density polyethylene of 20–140 mesh and a density of 0.912 to 0.933, applying a teflon sheet over the powder to make a smooth surface, heating at 290° to 350 ° F., cooling the patch to room temperature and removing the teflon sheet. The teflon sheet is utilized to shape the melting powder into the scratches and/or indentations in the ski base. The polyethylene materials utilized by the patent are in powdered form and have melt indices, densities, and physical, chemical and mechanical properties different from the ones utilized herein.

Accordingly, there is still a need for a sealant that is low in cost and suitable for the fast and simple repair of nicks, scratches, punctures, penetrations and gouges in polyethylene pipes and other similar surfaces which permits the in-situ repair of damage without the costly excision and removal of the damaged sections.

SUMMARY OF THE INVENTION

This invention relates to a composition of matter, that comprises about 100 to 800 parts by weight of polyethylenes and copolymers thereof having a melt index of about 1 to 4 g/10 min., a density of about 0.93 to 0.95 g/cc, and a weight average molecular weight of about $5 \times 10^4$ to $1 \times 10^5$;

about 100 to 400 parts per weight of polyethylenes having a melt index of about 2 to 6.5 g/10 min., a density of about 0.930 to 0.950g/cc, and a weight average molecular weight of about $6 \times 10^4$ to $2 \times 10^5$;

about 0 to 100 parts per weight of polypropylene having a melt index of about 5 to 9 g/10 min., and a density of about 0.8 to 1.2 g/cc;

about 0 to 150 parts by weight of copolymer selected from the group consisting of ethylene-propylene copolymers and ethylene-vinyl acetate copolymers;

about 0 to 100 parts by weight of powdered graphite or carbon black;

about 0.04 to 0.1 parts by weight of antioxidant; and about 0.1 to 2.0 parts by weight of ultraviolet radiation stabilizer.

This invention also relates to a sealant or thermoplastic repair material obtained by compression, extrusion or injection molding the composition of the invention.

Also disclosed herein is a polyethylene surface repair or reinforcing kit, that comprises the sealant or thermoplastic repair material of the invention;

a thin, heat-resistant, adhesion-resistant barrier; and a polyethylene surface cleaner.

Still part of this invention is a method of repairing or reinforcing a polyethylene surface, that comprises applying over an area of a polyethylene surface in need of repair or reinforcement the sealant or thermochemical repair material of the invention;

heating the area of contact between the sealant and the surface under conditions effective to produce thermal fusion therebetween;

joining the heated surfaces until fusion occurs; and cooling the fused surface.

Also provided herein is a method of preparing a polyethylene surface sealant or thermoplastic repair product of a desired shape, that comprises blending the composition of the invention; and compression, injection or extrusion molding the blend under conditions effective to form a product of a desired shape.

A more complete appreciation of the invention and many of the attendant advantages thereof will be readily perceived as the same becomes better understood by reference to the following detailed description when considered in connection with the following discussion.

BEST MODE FOR CARRYING OUT THE INVENTION

This invention arose from a desire by the inventor to improve on prior art technology for repairing and/or reinforcing polyethylene surfaces, particularly surfaces such as polyethylene pipes, which are subject to a certain degree of pressure. Up to the present time, the repair of such pipes entailed cutting, excising and replacing entire portions of the pipe, or the implementation of other elaborate and costly methods, which in many instances did not provide the repaired pipes with sufficient resistance to pressure for their successful long-term use.

An essential quality of the thermoplastic repair material (TCRM) is a sufficiently high melt index to facilitate good mobility in the fluid melt state. This assures a high degree of surface wetting, and a highly mobile polymer molecule capable of diffusion into the pipe surface. To effect a sound and desirable fusion or weld, the interface of the adherand and the adhesive must establish good chemical and physical bonds. This is facilitated by molecules whose kinetic energy and size distribution is such that they can overcome surface tension, surface viscosity barriers, and opposing dispersion forces to diffuse together. Other critical characteristics that the repair material must posses are inherent toughness and resistance to slow crack growth and resistance to rapid crack propagation.

To achieve these and other requirements of durability, the materials selected herein exhibit a selected degree of linear low-and medium-density components, a quantity of high-molecular weight, amorphous strands which serve as "tie molecules", which, together, prevent the disentanglement of fibrils when crazing is induced in stress areas. In all polyethylenes, crystallites are present, randomly distributed within amorphous masses. Care must be given, thus, to the selection of ingredients and processing of the materials to assure a uniform distribution of otherwise heterogeneous species of varied molecular weights, linearity, and branching.

The present composition has been designed to ensure a good mix of linear and branched ethylene homo- and co-polymers (e.g., hexene and octene co-monomers) of sufficient diversity to prevent liquid/liquid phase separation during any melting, molding, and fusion repair processes. The repair material must establish an intimate bond to the pipe, be as tough, crack and fatigue resistant as the pipe, and be capable of tolerating the application of sustained or cyclic loads, both pneumatic (gas pressure) and mechanical (soil movements, etc.), that are typical of such service application and requirements.

An additional feature of this invention is adaptability of the material to the encapsulation of heating wires such as electrical resistant wire used in electrofusion couplings and fittings. The uniquely adhesive feature of this composition is its ability to fuse to old, aged, oxidized pipe surfaces without the usual required scraping needed for conventional fusion practices. This is achieved by a combination of the inherent chemical and physical properties of the thermoplastic repair material of this invention, which induce a high degree of interfacial mixing, diffusion, and molecular entanglement and a proper chemical bonding at the pipe/patch interface. A considerable amount of intermolecular diffusion and entanglement at the bond line, facilitated by the combined physical and chemical properties of the product of the invention in addition to Van der Waals dispersion forces, hydrogen bonding, and electrostatic interaction appears to exist. Perforated polyethylene pipes repaired with the composition of this invention may fail under hydrostatic pressurization at a point in the pipe remote from the repair site, but not at the repair zone. Repairs may be effected by first wiping the pipe surface with a solvent such as an alcohol or an enzyme as is known in the art prior to heating and fusion. This is a marked departure from the usual and prescribed teachings of the prior art of scraping the pipe surface to remove oxidation and other weathering effects which normally inhibit good bonding. No scraping is necessary or required herein.

An additional feature of this invention is the adaptability of the material to various application methods such as sidewall fusion, hot glue gun approach, electrofusion, induction welding, extrusion and injection molding, etc.

Another feature of this invention is the applicability and utility of this material for the production of plastic products, films, pipes and molded articles.

The present composition comprises a blend of polyethylene polymers and co-polymers of ethylene with e.g., hexene and octerie comprising medium- and high-melt indices with varied molecular weights, linear and branched chains, optionally compounded with polypropylene and/or copolymers of ethylene/propylene and-/or ethylene/vinyl acetate. These blends have been shown to have outstanding adhesion characteristics when proportioned as described herein, and molded and applied in accordance with this invention.

The polyolefin components may be purchased commercially. Suitable polyolefins are, for instance, Microthene ® Ma-778, Mlcrothene ® FN-500, Microthene ® MP-643066, Microthene ® PP6820-HU, Microthene ® FE-532, Dowlex ® 2038, U.C. Tuflin ® HS-7023, and the like. The Microthene ® Ma-643066, Dowlex ® 2038, and U.C. Tuflin ® HS-7023 polyolefins satisfy the required elements of the preferred composition. The remaining products are optional. The remaining components are known in the art and are commercially available.

This invention provides a composition of matter, that comprises about 100 to 800 parts by weight of polyethylenes or copolymers thereof having a melt index of about 1 to 4 g/10 min., a density of about 0.93 to 0.95 g/cc, and a weight average molecular weight of about $5 \times 10^4$ to $1 \times 10^5$;

about 100 to 400 parts by weight of polyethylenes having a melt index of about 2 to 4 g/10 rain, a density of about 0.930 to 0.950 g/cc, and a weight average molecular weight of about $6 \times 10^4$ to $2 \times 10^5$;

about 0 to 20 parts per weight of powdered polypropylene having a melt index of about 5 to 9 g/10 min., and a density of about 0.8 to 1.2 g/cc;

about 0 to 150 parts by weight of copolymer selected from the group consisting of ethylene-propylene copolymers and ethylenevinyl acetate copolymers; about 0 to 100 parts by weight of powdered graphite or carbon black;

about 0.04 to 0.1 parts by weight of antioxidant; and about 0.1 to 2.0 parts by weight of ultraviolet radiation stabilizer.

In a particularly preferred embodiment of the invention, the composition of matter comprises about 450 to 800 parts by weight of linear low density polyethylene co-polymers having a melt index of about 1 g/10 min., a density of about 0.93 to 0.945 g/cc, and a weight average molecular weight of about $5 \times 10^4$ to $1.6 \times 10^5$ (e.g., Dowlex ® 2038);

about 100 to 120 parts by weight of polyethylenes having a melt index of about 4 g/10 min., a density of about 0.935 to 0.94 g/cc, and a weight average molecular weight of about $6 \times 10^4$ to $8 \times 10^5$ (e.g., Microthene ® MA-643066);

about 5 to 100 parts by weight of co-polymers selected from the group consisting of ethylene-propylene copolymer and ethylenevinyl acetate copolymers;

about 5 to 22 parts by weight of powdered graphite or carbon black;

about 0.06 to 0.08 parts by weight of antioxidant; and about 0.4 to 0.8 parts by weight of an ultraviolet light stabilizer.

In another preferred embodiment, the composition of matter, comprises about 100 to 450 parts by weight linear low density polyethylenes and co-polymers thereof having a melt index of about 2 g/10 min., a density of about 0.935 to 0.945 g/cc, and a weight average molecular weight of about $5 \times 10^4$ to $1.8 \times 10^5$ (e.g., U. Carbide's HS-7023 Natural 7 or Microthene ® MP-643);

about 100 to 300 parts by weight polyethylene having a melt index of about 4 to 6.5 g/10 min., a density of about 0.935 to 0.94, and a weight average molecular weight of about $6 \times 10^4$ to $1.8 \times 10^5$ (e.g., Microthene ® MP-643);

about 5 to 80 parts by weight polypropylene having a melt index of about 5 to 9 g/10 min., and a density of about 0.90 g/cc; and about 0.001 to 50 parts per weight of carbon black.

In a still more preferred embodiment, the composition comprises about 100 to 300 parts by weight linear low density polyethylene copolymers having a melt index of about 1 g/10 min., a density of about 0.935 to 0.940 g/cc and a weight average molecular weight of about $5 \times 10^4$ to $1.6 \times 10^5$;

about 100 to 200 parts by weight linear low density polyethylene copolymers having a melt index of about 4 to 6.5 g/10 min., a density of about 0.935 to 0.940 g/cc, and a weight average molecular weight of about $6 \times 10^4$ to $1.8 \times 10^5$;

about 0.01 to 25 parts by weight powdered polypropylene having a melt index of about 5 to 9 g/10 min., and a density of about 0.90 g/cc; and about 0.01 to 25 parts by weight carbon black.

The materials of the composition disclosed herein may be in powered or pelletized form.

In accordance to the invention, a sealant or thermochemical repair material may be obtained by compounding and pelletizing by extrusion the composition of this invention, and then compression, extrusion or injection molding the pelletized composition. The composition may be molded into rectangular plates, strips and other forms such as pipes, tees, couplings, saddles or rods (e.g., for hot glue gun application and spin friction fusion), preferably having a thickness of about 0.10 to 0.50 inch, and preferably about 0.25 to 0.5 inch. Typically, the size of the plates may be about 2 to 10 inches by 2 to 10 inches, and more preferably about 2 to 4 inches by 2 to 4 inches. By means of example, a sheet or plate of about $4 \times 4$ inches may be used to repair holes that are 0.5 inch in diameter, cuts that are about 1 inch long, scratches, gouges, etc. However, sheets, plates or coupons may be provided in different sizes and shapes as well as thicknesses to accommodate varied pipe diameters and thicknesses. An artisan will know what size and shape to use for different applications.

The sealant or thermochemical repair material obtained by compression, extrusion or injection molding the composition of the invention may comprise the basic components of the composition such as polyethylene and its co-polymers with hexene, and/or octeries, polypropylenes, and copolymers of ethylene-propylene or ethylene-vinyl acetate, graphite or carbon black, antioxidants and light stabilizers. In addition, the composition of this invention may comprise other optional components that are standard in the art, provided that the melt index is at least 2 and preferably 3 to 4.

The composition containing these optional components may, in general, be utilized for applications such as repairing by hot glue gun welding, fusion by induction heating, microwave heating, electric resistance heating, and the like.

This invention also provides a polyethylene surface repair or reinforcing kit, that comprises the sealant or thermoplastic repair material described above;

a thin, heat-resistant, adhesion-barrier sheet; and a polyethylene surface cleaner.

In one preferred embodiment of the invention, the surface cleaner utilized herein comprises an enzyme cleaner. The cleaner may be applied to the surface to be repaired in order to eliminate oil, dirt and other surface contaminants. Suitable enzymes are Enzyme Cleaner Degreasers #105, #106 and #109 (International Enzyme, Inc.). However, other detergents and/or enzymes may also be utilized, including alcohols.

The enzyme cleaner may be applied as a dilute solution or as a concentrate. The solution may be an aqueous solution of enzymes and/or surfactants comprising preferably about 6–10% of the active agents. The composition may then be applied to the polyethylene surface as is known in the art.

The thin adhesion-resistant barrier of the repair or reinforcing kit may comprise a polytetrafluoroethylene sheet or coating for placing over a heating iron utilized to fuse the surfaces. However, other thin, heat-resistant, adhesion-resistant materials may also be utilized for the manufacture of this sheet or coating. In another embodiment, the adhesive barrier sheet may be employed as an intimate and permanent coating placed on the heater surface or as a removable, unattached barrier film coated thereon.

The composition of the invention may be utilized to repair pipes which have holes, gashes, cuts, scratches, gouges and the like. For medium-density polyethylene pipes, the thus repaired surfaces will resist hydrothermal burst pressures of over 600 psi., at which pressure the original pipe material will fail but not the adhesive patch utilized for repairing or reinforcing the surface or the area of fusion therebetween. In addition, the present product is suitable for repairing thermoplastic membranes, such as polyethylene membranes, used in landfill operations and the like, and for the production of polyethylene products including films and pipes.

The method of repairing or reinforcing a polyethylene surface of the invention, comprises applying the sealant or thermoplastic repair material of the invention over an area of a polyethylene surface in need of repair or reinforcement;

heating the area of contact between the sealant or thermoplastic repair material and the surface to be repaired under conditions effective to produce substantial thermal fusion therebetween;

joining the heated surfaces until fusion occurs; and cooling the fused area.

In general, the sealant or thermoplastic repair material is applied in the form of a plate or the like over an area that extends beyond the cut, dent or scratch of the polyethylene surface to substantially cover it and provide some overlapping around it. The area of contact between the sealant or thermoplastic repair material and the surface is then heated at about 350° to 450° F., and preferably about 385° to 400° F., for a period of time of, e.g., about 5 to 50 seconds, and more preferably about 10 to 15 seconds. The heating time, however, may vary as suited for specific applications and the thickness of the sealant or thermoplastic repair material.

The heat may be applied at the pipe sealant interface, preferably with moderate pressure of about 1 to 50 psi., over the sealant material, and more preferably about 10 to 20 psi. The heat source may be placed between the sealant and the pipe surface. After the sealant and pipe surfaces are heated to a desired temperature, the heat source may be removed and the sealant and pipe surfaces placed in contact with one another to attain fusion. The pressure may be maintained for 10 to 15 seconds to assure good interfacial contact and molecular diffusion. Once the heating is completed, the repaired area may be cooled to ambient temperature. The cooling may be attained by ambient cooling or by rapid quenching with a liquid such as water.

In a preferred embodiment of the invention, the method further comprises cleaning the area of the surface to be repaired or reinforced prior to heating and/or applying the sealant. The area of the surface to be repaired or reinforced may be cleaned with a cleaning enzyme in the form of a solution sprayed or wiped over the pipe surface and then rinsed. In many cases an alcohol wipe to remove surface dust, water and oils is adequate. Examples of enzyme cleaners suitable for use herein are known in the art, and some examples were provided above.

In another preferred embodiment, the method of the invention, further comprises applying a thin, heat-resistant, adhesion-resistant barrier over the sealant or thermoplastic repair material and positioning a heat source between the surface and the sealant prior to heating; and removing the thin sheet after cooling.

In one preferred embodiment, the adhesion-resistant barrier comprises a polytetrafluoroethylene or teflon sheet. The sheet may typically be of a thickness of about 1/16 to 1/8 inches, and more preferably about 1/12 to 1/10 inches. The thin sheet is preferably placed between the sealant and the heat source and it may remain on the sealant surface until it cools, at which point it may be easily removed.

Also provided herein is a method of preparing a sealant or thermochemical repair product, that comprises blending the composition described above; and compression, injection or extrusion molding the blend under conditions effective to form a product into a desired shape.

Methods for blending the different components such as polyethylenes, copolymers, graphite, carbon black and the like, are known in the art. Briefly, the polyethylene components are admixed together with the copolymer(s), the graphite, carbon black, antioxidant and light stabilizer and homogenized or compounded by, e.g., applying a twin screw extrusion device which generates homogeneous pellets of about 1/8 inch in diameter, adequate for molding.

Methods for processing the compounded pellets such as compression, injection or extrusion molding are known in the art.

Typically, injection molding may be conducted as follows. A melted or fluidized thermoplastic material may be injected or forced into a cool mold where it chills enough to be removed in a solid state, duplicating the cavity of the mold. The mold may consist of a single cavity or a number of similar or dissimilar cavities, each connected to flow channels or "runners" which direct the flow of the melted plastic to the individual cavities. This method is one of the most economical ones for mass producing a single item. The part taken from the mold is, in most cases, a finished product ready to be packed and shipped, or is ready to be used as part of an assembled unit. In contrast to metal forming, there is very little, if any, material wasted in injection molding. Runners and sprues may be reground and reused. By using hot runner molds, the sprue and runner system are allowed to remain in a melted state in the mold and become part of the next finished part. The hot runners may be thought of as an extension of the plasticizing chamber. Usually, the remaining part and the mold may be designed so that no subsequent machining is required. If this is not possible for a certain design, conventional cutting tools may be used, although some modifications of the cutting tip and periphery speeds may be implemented to prevent a buildup of heat.

Extrusion molding to form the blend into a desired shape may be conducted as follows. The process of extrusion comprises, basically, forcing a hot plastic melt through a die having an opening shaped to produce a cross-section of a desired configuration. A basic extruder comprises a screw enclosed in a barrel, the purpose of which is to produce a fully plasticized and thermally homogeneous melt, provide the driving force to make the material flow through the die, and maintain a uniform flow rate of the material through the die. Extrusion is widely used in the plastics industry for the production of continuous lengths of thermoplastic materials having constant geometrical cross-sections. The cross-sections may be regular cross-sections such as those of a rod, pipe, flat and tubular film and heavy sheeting, or may have an irregular profile such as one comprising channels, tees, angles and tubular gasketing. Extrusion is also used in such processes as wire and web coating, and in blow molding among others.

A more recent application of extrusion, and one which is becoming increasingly important, is for plasticating cylinders for feeding injection molding machines.

Having now generally described this invention, the same will be better understood by reference to certain specific examples, which are included herein for purposes of illustration only and are not intended to be limiting of the invention nor any embodiment thereof, unless so specified.

EXAMPLES

Example 1:

The following compositions 1 to 18 were prepared as described containing the materials shown in the Table below. The temperatures utilized for repairing of a surface are also shown in Table 1 below.

Example 2:

Formulations Nos. 12, 13, and 16 were tested in the laboratory using compression molded sheets or coupons and applied to the cold pipe, heated to 400° F. with a mantle using a Teflon ® barrier to prevent sticking to the heater. Pipes repaired, thus, performed well in pressure tests and other adhesive bonding tests. When these recipes were subsequently compounded and extruded by conventional industrial processes and used to repair pipes employing field type equipment, such as a sidewall fusion device, excessive sticking to the Teflon ®-coated heating irons made the application more difficult. Furthermore, the industrially extruded sheets exhibited different, inferior properties due to phase separation and an excessively high melt index (8–10 g/min), which allowed the melt to become excessively thin and fluid. This permitted liquid/liquid phase separation and reduced toughness as well as other mechanical properties compared to later recipes such as Nos. 20–25. When applied as a coating to metal surfaces, however, this feature proves advantageous and facilitates good and durable adhesion.

A preferred formulation of this invention comprises recipe No. 21. Recipes 20 to 25, however, also have significant virtues, and are, therefore, also preferred. Of these, recipe No. 21 has been repeatedly tested with the most encouraging results.

The compositions and some characteristics of these formulations are shown in Table 2 below.

TABLE 1

| Recipe # | Scalant Parameter Study | | | | | | | | | |
|---|---|---|---|---|---|---|---|---|---|---|
| | 1 | 2 | 3 | 4 | 5 | 6 | 7 | 8 | 9 | 10 |
| Composition | | | | | | | | | | |
| MA-750* | | | | | | | | | | 200 |
| MA-778* | 400 | 400 | 400 | 400 | 400 | 400 | 400 | 400 | 400 | 400 |
| FN 500* | 100 | 100 | 200 | 40 | 100 | 80 | 60 | 40 | 200 | 200 |
| FE 532* | | | 100 | | 20 | 28 | 32 | 40 | 200 | |
| PP 6820-HV* | | | | | | | | | | |
| Graphite[1] | (1%)5[1] | (1%)5[1] | (1%)7[1] | | 4[1] | 4[1] | 4[1] | 4[1] | 8[2] | 8[2] |
| Carbon Black[1] | | | | | | | | | | |
| Naphthalene | | | | | | | | | | 8 |
| Iganox 1010 | | | | | | | | | | |
| Chemisorb-944 FL | | | | | | | | | | |
| Temperature, °F. | 350 | 350 | | 350 | 350 | 300 | 300 | 300 | 300 | 300 |
| Pressure, psi | 20 | 20 | 20 | 20 | 20 | 20 | 20 | 20 | 20 | 20 |
| Density-Calculated | .942 | .938 | .939 | .946 | .942 | .942 | .944 | .944 | .943 | .943 |
| Density-Measured | .925 | .933 | .935 | .920 | .931 | .921 | .916 | .915 | .876 | .921 |

| Recipe # | 11 | 12 | 13 | 14 | 15 | 16 | 17 | 18 |
|---|---|---|---|---|---|---|---|---|
| Composition | | | | | | | | |
| MA-750* | | | | | | | | |
| MA-778* | 400 | 400 | 300 | 300 | 350 | 300 | 300 | 200 |
| FN 500* | 100 | 100 | 200 | 200 | 100 | 100 | 200 | 300 |
| FE 532* | | | | | | | | |
| PP 6820-HV* | | | | | 50 | 100 | 100 | — |
| Graphite[1] | 1%[2] | 1%[2] | 1%[2] | 1%[2] | 1%[2] | 1%[2] | 1%[2] | 1%[2] |
| Carbon Black[1] | | | | | | | | |
| Naphthalene | | | | | | | | |
| Iganox 1010 | .02% | .02% | .04% | .06% | .04% | .04% | .04% | .04% |
| Chemisorb-944 FL | .15% | .15% | .15% | .15% | .15% | .15% | .15% | .15% |
| Temperature, °F. | | 400 | 400 | 400 | 400 | 400 | 400 | 400 |
| Pressure, psi | 20 | 20 | 20 | 20 | 20 | 20 | 20 | 20 |
| Density-Calculated | .935 | .935 | .935 | | .925 | .920 | | |
| Density-Measured | .929 | .929 | .935 | | .920 | .915 | | |

*Microthene ® powdered polyolefins and copolymers; Quantum Chemical Corp., USI division.

TABLE 2

| | Composition and Characteristics of Various Formulations | | | | | | |
|---|---|---|---|---|---|---|---|
| Formulation | 19 | 20 | 21 | 22 | 23 | 24 | 25 |
| Microthene MA 643 | 200 | 100* | 100 | 200 | — | 100 | — |
| Dowlex 2038 | 400 | 300 | 200 | 200 | 100 | — | — |

TABLE 2-continued

| Composition and Characteristics of Various Formulations | | | | | | | |
|---|---|---|---|---|---|---|---|
| Formulation | 19 | 20 | 21 | 22 | 23 | 24 | 25 |
| Union Carbide Tuflin HS 7023-Natural 7 | 100 | 50 | 50 | 100 | — | — | 200 |
| Microthene FN 500 | — | 50 | — | 10 | — | — | — |
| PP687-HV | — | 5 | — | 5 | — | — | — |
| Irganox 1010[1] (%) | .02 | .02 | .02 | .02 | .02 | .02 | .02 |
| Chemisorb 944FL[1] % | .15 | .15 | .15 | .15 | .15 | .15 | .15 |
| Temperature (°F.) | 400 | 400 | 400 | 400 | 400 | 400 | 400 |
| Interfacial Pressure (psi)+ | 20 | 20 | 20 | 20 | 20 | 20 | 20 |
| Calculated Density | .940 | .940 | .945 | .945 | .935 | .940 | .941 |
| Measured Density | .938 | .938 | .940 | .940 | .935 | .940 | .941 |
| Carbon Black and other Pigments | .2% | <1% | <1% | <1% | <1% | <1% | 1% |

[1] Percent basis total polymers
*Amounts are parts by weight
+A 100 lb pressure load was applied to about 52 in² sealant/pipe surface The invention now being fully described, it will be apparent to one of ordinary skill in the art that many changes and modifications can be made thereto without departing from the spirit or scope of the invention as set forth therein.

What is claimed as novel in letters patent of the United States is:

1. A thermoplastic repair and coating composition, comprising about 100 to 800 parts by weight of polyethylenes or copolymers thereof having a melt index of about 1 to 4 g/10 min., a density of about 0.93 to 0.95 g/cc, and a weight average molecular weight of about $5 \times 10^4$ to $1 \times 10^5$;

about 100 to 400 parts by weight of polyethylene having a melt index of about 2 to 6.5 g/10 min., a density of about 0.930 to 0.950 g/cc, and a molecular weight of about $6 \times 10^4$ to $2 \times 10^5$;

about 0 to 100 parts per weight of polypropylene having a melt index of about 5 to 9 g/10 min., and a density of about 0.8 to 1.2 g/cc;

about 0 to 150 parts by weight of copolymer selected from the group consisting of ethylene-propylene copolymers and ethylene-vinyl acetate copolymers;

about 0 to 100 parts by weight of graphite or carbon black;

about 0.04 to 0.1 parts by weight of antioxidant; and about 0.1 to 2.0 parts by weight of ultraviolet radiation stabilizer, said composition having adhesive properties that make it suitable for the repair and coating of soiled surfaces in the absence of cleaning and scraping.

2. The composition of claim 1, comprising about 100 to 300 parts by weight polyethylenes having a melt index of about 1.0 g/10 min., a density of about 0.935 to 0.940 g/cc, and a weight average molecular weight of about $6 \times 10^4$ to $1.8 \times 10^5$;

about 100-200 parts by weight polyethylenes having a melt index of about 4 to 6.5 g/10 min., a density of about 0.930 to 0.950 g/cc, and a weight average molecular weight of about $5 \times 10^4$ to $1.8 \times 10^5$;

about 5 to 80 parts by weight of polypropylene having a melt index of about 6 to 8 g/10 min., and a density of about 0.90 g/cc; about 0.001 to 100 parts by weight of copolymer selected from the group consisting of ethylene-propylene copolymers and ethylene-vinyl acetate copolymers; and about 5 to 50 parts by weight of carbon black.

3. The composition of claim 1 in the form of a pellet or a powder.

4. A sealant or thermoplastic repair material obtained by a method comprising compression, extrusion or injection molding the composition of claim 1.

5. A sealant or thermoplastic repair material obtained by a method comprising compression, extrusion or injection molding the composition of claim 3.

6. The material of claim 4, in the form of a sheet, plate or pipe.

7. The material of claim 6, wherein the sheet, plate or pipe has a thickness of about 0.10 to 0.50 inch; and a length of about 0.01 to 10 inches.

8. A method of using a composition of matter in a blend to prepare a thermoplastic polyethylene repair and coating product of a desired shape, comprising blending the repair and coating composition of claim 1; and compression, injection or extrusion molding the blend under conditions effective to form a repair or coating product of a desired shape.

9. The method of claim 8, wherein the sealant product has a shape selected from the group consisting of a sheet, a rod, a pipe, a saddle, and a coupling.

* * * * *